Feb. 26, 1957  A. WEISSELBERG  2,782,844
STAGE EVAPORATOR APPARATUS
Filed Sept. 30, 1955  2 Sheets-Sheet 1

INVENTOR.
ARNOLD WEISSELBERG
BY
ATTORNEY.

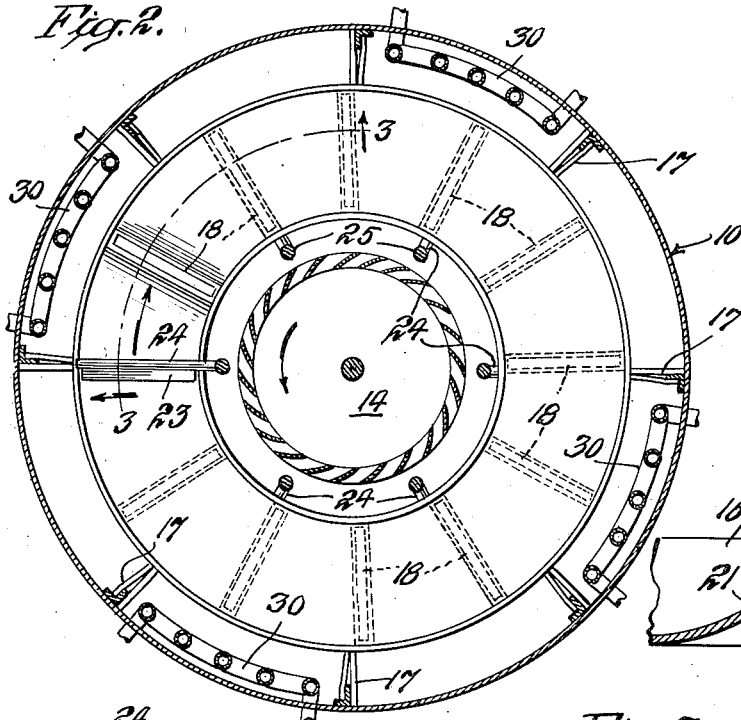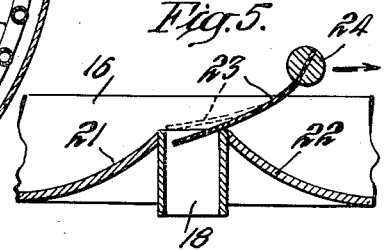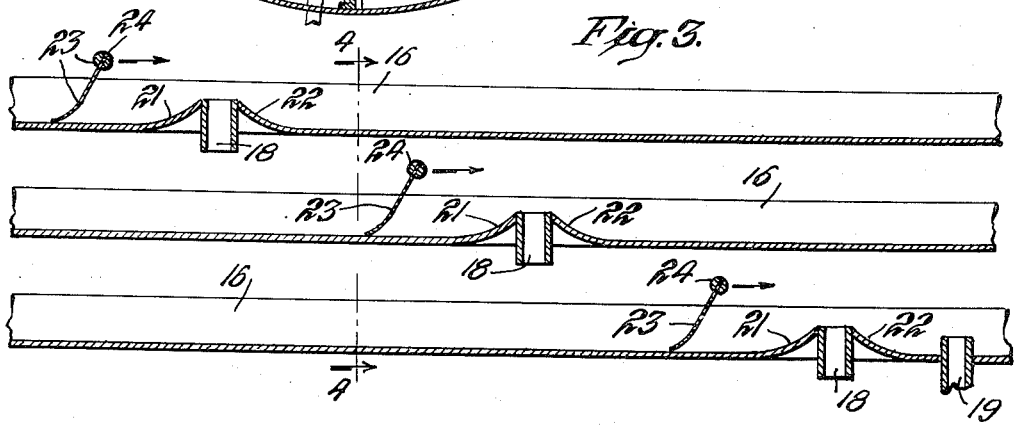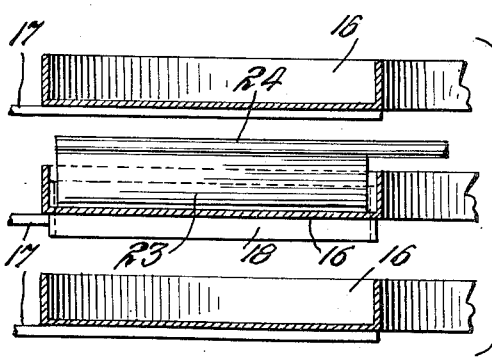

United States Patent Office 2,782,844
Patented Feb. 26, 1957

2,782,844

STAGE EVAPORATOR APPARATUS

Arnold Weisselberg, Leonia, N. J.

Application September 30, 1955, Serial No. 537,676

7 Claims. (Cl. 159—18)

The invention relates to evaporator apparatus of the stage type and adapted for artificial evaporation processes, more particularly in the concentration and/or crystallization of solutions, slurries and like liquors.

It has for an object to provide a vertical type unit for continuous stage evaporation and embodying a novel transferring arrangement whereby the solute and/or crystallized component therefrom is transferred continuously from stage to stage and without undue tumbing so as to be able to obtain relatively coarse fractions.

Another object of the invention is to provide a self-contained unit including superposed communicating pans for a liquid carrier or solvent, said pans having associated therewith means for transferring automatically material from one pan level to the next succeeding lower one.

A further object of the invention is to provide, in a self-contained drying unit embodying a housing closed at the top, annular pans having discharge means of novel construction.

A still further object of the invention is to associate, for transfer of material, circularly movable rake members with the respective pans and coaxially therewith in the housing.

The invention has for an object, also, to provide internal turbo-type means for forced circulation of a gaseous drying medium over the pans, said means being driven independently of the rake members.

Still another object of the invention is to provide a novel rake member for effecting discharge from an associated pan.

In carrying out the invention, a series of open annular pans are superposed within a housing, closed at the top; and these pans are provided with novel discharge means over which are caused to travel circularly rake members dipping into the pans to advance the material to the discharge means of a pan, said rake members being also of novel construction to pass over said discharge means. There is provided also within the housing and coaxially with the annular pans and rake members turbo-type means for effecting a forced circulation over said pans of a, preferably heated, gaseous medium; and the same is driven independently of the means for effecting circular travel of the rake members through the respective pans. A feed inlet is provided at the top of the housing for supply of material to the uppermost one of the series of pans; and, also, an outlet for spent air or other suitable gaseous evaporating medium. In addition, there is provided an outlet at the bottom of the unit for discharge of crystallized or granular material from the lowermost pan into drainage bins and the like.

The nature of the invention, however, will best be understood when described in connection with the accompanying drawings, in which:

Fig. 2 is a horizontal section thereof, taken on the line 2—2, Fig. 1 of the drawings, and looking in the direction of the arrows.

Fig. 3 is a fragmentary, developed vertical section, on an enlarged scale, taken on the line 3—3, Fig. 2, and looking in the direction of the arrows.

Fig. 4 is a fragmentary vertical transverse section taken on the line 4—4, Fig. 3, and looking in the direction of the arrows.

Fig. 5 is a fragmentary vertical section, on an enlarged scale, illustrating the action of a rake member in clearing a dam of a pan.

Figure 1:
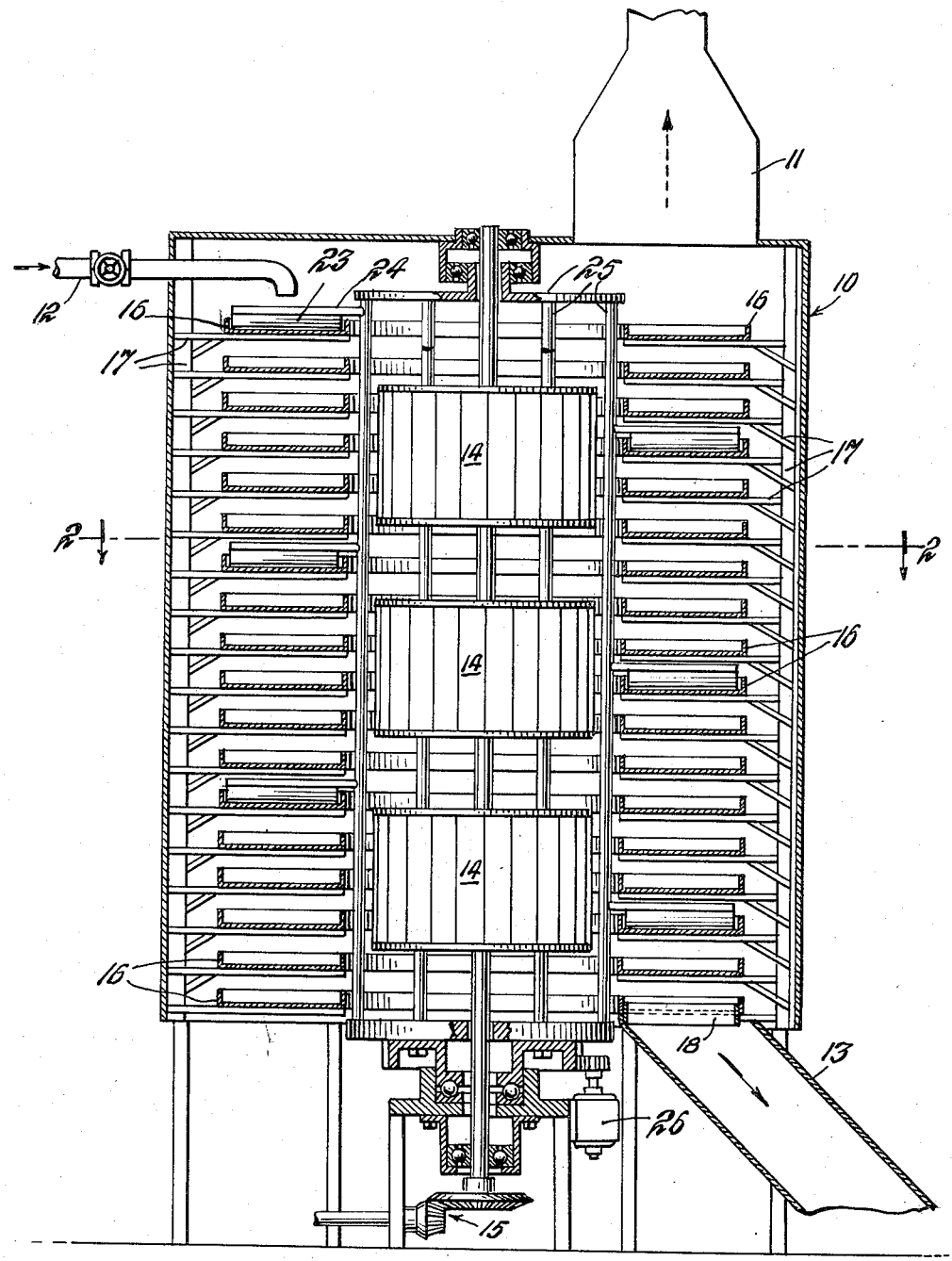
Fig. 1 is a vertical section through the novel evaporator apparatus.

Referring to the drawings, 10 designates a vertically disposed housing of cylindrical or polygonal shape and of thermally insulating material, said housing having at the top an outlet stack 11 for a gaseous drying (evaporating) medium. An inlet pipe 12 enters the housing, also at the top, for discharge of a slurry or a liquid containing a solute for concentration or crystallization of solid matter; and such liquor is conveyed, in manner hereinafter more fully set forth, in successive stages down through the cylinder toward a discharge chute 13 provided at the bottom of the housing adapted to receive granular or crystallized material and/or liquid.

Mounted axially within the housing is a turbo type of fan 14, rotated by a motor (not shown) through a drive 15, for effecting a forced circulation of a suitable gaseous medium for evaporating the solvent or suspending liquid. The latter, discharged from inlet 12, is received by the uppermost of a series of annular superposed pans 16 secured to the inner wall of the housing, by frame member 17, the pans being separated vertically to a sufficient extent to permit the gaseous medium to flow freely over liquid contained in a pan as well as to accommodate rake means, as hereinafter more fully set forth, said flow being directed substantially radially outward from the turbo fans. Each pan is provided also with an outlet 18 through which liquid is caused to travel or be transferred from one pan to the next succeeding lower one. The last or lowermost pan is provided also with an overflow tube 19 to prevent discharge of liquid into the chute 13, being to this end at a level in the pan somewhat below the upper opening of outlet 18.

Referring more particularly to Figs. 3 to 5, inclusive, the outlets 18 are of generally rectangular shape, comprising members which extend entirely transversely of a pan to provide also a dam thereat of a height somewhat less than the side walls of the pan. Each member 18 extends, preferably, also a slight distance below the bottom of a pan to direct discharged matter into the next succeeding pan. In installing such dam, the bottom of a pan is cut out, with the bottom walls immediately adjacent thereto bent upwardly, as indicated at 21, 22, to accommodate a member 18. The free edges of these walls are then sealed to the corresponding top edges of the outlet members. This affords a smooth path of approach for a wiper or rake element 23 in advancing material in a pan to the outlet for discharge therethrough; and to this end a rake element is more or less flexible, particularly at its free end, so as to deflect upwardly in contacting a dam, as is indicated in the dotted-line position, Fig. 5 of the drawings. The bank of rake elements for the respective pans is circularly rotatable above the respective pans, being supported through rods 24 which extend radially from a framing 25 mounted coaxially with and for rotation about the turbo fan unit and driven from a motor 26.

To enchance the evaporative effect, provision may be made, as is well understood in the art, to heat the evaporating gaseous medium, either prior to admission into the unit or through heating means contained within the unit itself. Thus, as is indicated fragmentarily in Fig. 2, vertically disposed heating coils 30 may be introduced between the pans and the inner face of the housing 10.

Aside from the saving of floor area required, the hereinbefore described vertical type of evaporator apparatus presents, in its novel construction, a decided advantage over the conventional single-pan system. Thus, it permits the use of forced circulation of the evaporating medium; also, the contents under evaporation remain completely enclosed. Moreover, any desired evaporating medium be utlized and ready control of the same is feasible. Furthermore, the provision of the dams in the respective pans admits of ready control of the flow of the liquor commensurate with the rate of evaporation, thus effecting a saving in liquid pumping operating costs.

I claim:

1. In a stage evaporator unit for a solute or solid contained in an evaporable liquid, said unit including a closed housing with an inlet at the top thereof for the liquid and also an outlet stack for a gaseous drying medium: a set of superposed fans coaxially disposed vertically within the housing, and means to rotate the same for circulating a gaseous drying medium; a set of superposed, radially extending rake elements mounted about the fans coaxially therewith; superposed annular pans supported horizontally by the housing and mounted respectively beneath the corresponding rake elements which are adapted to dip therein, each pan being provided with a radial dam affording an opening directed to the next succeeding lower pan, the associated rake elements being adapted to ride over the corresponding dams—all contained within the housing; and means to effect relative rotation between the rake elements and the pans about the vertical axis of the housing.

2. A stage evaporator unit according to claim 1, wherein the outer portion of the rake elements is flexible to ride over a dam.

3. A stage evaporator unit according to claim 1, wherein the respective dams of successive pans are circularly staggered relatively to one another along a helix.

4. A stage evaporator unit according to claim 3, wherein the respective rake elements are correspondingly staggered.

5. A stage evaporator unit according to claim 1, wherein an overflow tube is provided in the lowermost of the pans, with level of inlet opening below that of the dam opening of said pan.

6. A stage evaporator unit according to claim 1, wherein the respective bottoms of the pans are transversely punctured to provide a rectangular aperture, an outlet member is fitted to the aperture and extends above the bottom of the pan, and the bottom portions of the pan adjacent the aperture are turned upwardly to meet the respective top edges of the outlet member and provide thereby the dam thereof.

7. In a stage evaporator unit for a solute or solid contained in an evaporable liquid, said unit including a closed housing with an inlet at the top thereof for the liquid and also an outlet stack for a gaseous drying medium: a set of superposed fans, mounted axially within the housing, adapted to direct radially a gaseous drying medium, and means to rotate said fans; a vertically disposed framing about the set of fans, and means to rotate the same, and a set of superposed, radially extending rake elements carried by said framing; and a plurality of superposed annular pans supported from the housing respectively below corresponding rake elements which are adapted to dip therein, each pan being provided with a dam affording an opening through the bottom of a pan, the associated rake elements above a pan being adapted to ride over the corresponding dam and having their ends of flexible material.

References Cited in the file of this patent

UNITED STATES PATENTS

| | | |
|---|---|---|
| 705,914 | Fleming | July 29, 1902 |
| 1,324,417 | Thunholm | Dec. 9, 1919 |
| 2,023,426 | Lasley | Dec. 10, 1935 |

FOREIGN PATENTS

| | | |
|---|---|---|
| 504,723 | Belgium | Aug. 14, 1951 |